US007144592B2

(12) United States Patent
Rader et al.

(10) Patent No.: US 7,144,592 B2
(45) Date of Patent: Dec. 5, 2006

(54) METHOD OF PREPARING A FULLY KETTLE HOP FLAVORED BEVERAGE

(75) Inventors: Sydney R. Rader, Fredonia, WI (US); Matthew L. Tripp, Mattawan, MI (US); Patrick L. Ting, Brookfield, WI (US); Vinod K. Chaudhary, Mequon, WI (US); Henry Goldstein, Brookfield, WI (US); Robert J. Mizerak, Oconomowoc, WI (US); Subba C. Rao, Brookfield, WI (US); David S. Ryder, Mequon, WI (US); Hetvin A. Wilkinson, deceased, late of Wauwatosa, WI (US); by Regina Wilkinson, legal representative, Wauwatosa, WI (US)

(73) Assignee: Nissan Technical Center North America MI (US)

( * ) Notice: Subject to any disclaimer, the term of this patent is extended or adjusted under 35 U.S.C. 154(b) by 323 days.

(21) Appl. No.: 10/074,830

(22) Filed: Mar. 9, 2005

(65) Prior Publication Data
US 2002/0110619 A1  Aug. 15, 2002

Related U.S. Application Data

(60) Division of application No. 08/892,898, filed on Jul. 14, 1997, now abandoned, which is a continuation-in-part of application No. 08/469,381, filed on Jun. 6, 1995, now abandoned, which is a continuation-in-part of application No. 08/218,559, filed on Mar. 28, 1994, now abandoned.

(51) Int. Cl.
*C12C 11/00* (2006.01)
*C12C 3/00* (2006.01)
(52) U.S. Cl. .................... 426/29; 426/600
(58) Field of Classification Search .......... 426/600, 426/29
See application file for complete search history.

(56) References Cited

U.S. PATENT DOCUMENTS

| 1,464,520 | A |   | 8/1923  | Von Horst      | 426/600   |
|-----------|---|---|---------|----------------|-----------|
| 3,044,879 | A |   | 7/1962  | Koch et al.    | 99/50.5   |
| 3,552,975 | A |   | 1/1971  | Worden et al.  | 99/50.5   |
| 3,787,499 | A |   | 1/1974  | Grant          | 260/586 R |
| 4,104,409 | A | * | 8/1978  | Vitzthum et al.| 426/386   |
| 4,315,038 | A |   | 2/1982  | Townsley et al.| 426/430   |
| 4,344,978 | A |   | 8/1982  | Sharpe et al.  | 426/600   |
| 4,389,421 | A |   | 6/1983  | Palamand       | 426/330.4 |
| 4,759,941 | A |   | 7/1988  | Chicoye et al. | 426/600   |
| 4,778,691 | A |   | 10/1988 | Todd, Jr. et al.| 426/600  |
| 5,073,396 | A |   | 12/1991 | Todd, Jr.      | 426/592   |
| 5,120,557 | A |   | 6/1992  | Owades         | 426/330.3 |

FOREIGN PATENT DOCUMENTS

| BE | 197012  | 12/1970 |
| BE | 753555  | 12/1970 |
| DE | 2627534 | 12/1977 |
| DE | 3414977 | 11/1985 |
| GB | 6243    | 5/1885  |
| SU | 1622385 | 8/1988  |
| SU | 1601112 | 10/1990 |

OTHER PUBLICATIONS

Klopper et al., Abstract of Brauwissenschaft 23, (9) 1970, pp. 329-332.*
Briggs, et al., Malting and Brewing Science, vol. I, New York, Chapman Hall, p. 6, 1971.

* cited by examiner

*Primary Examiner*—Keith Hendricks
(74) *Attorney, Agent, or Firm*—Global IP Counselors

(57) ABSTRACT

A method of making a fully hop flavored beverage employs a hop flavoring agent comprising an extract of hop solids, the hop solids being the residue of a first extraction of hops to remove the alpha acids. Preferably, liquid carbon dioxide is used for the first extraction of the hops and a polar solvent, such as ethanol or water, is used to extract the hop solids. Beverages made by the method and novel compositions for use in the method are also disclosed.

7 Claims, No Drawings

METHOD OF PREPARING A FULLY KETTLE HOP FLAVORED BEVERAGE

CROSS-REFERENCE TO RELATED APPLICATION

This application a divisional of U.S. Ser. No. 08/892,898 filed Jul. 14, 1997, now abandoned, which is a continuation-in-part of Ser. No. 08/469,381 filed Jun. 6, 1995, now abandoned, which is a continuation-in-part of Ser. No. 08/218,559 filed Mar. 28, 1994, now abandoned.

STATEMENT REGARDING FEDERALLY SPONSORED RESEARCH AND DEVELOPMENT

Not applicable.

BACKGROUND OF THE INVENTION

1. Field of the Invention

The present invention generally relates to adding a hop flavor to beverages. More particularly, it relates to novel methods of preparing fully kettle hop flavored beverages and compositions for use in such methods.

2. Background of the Art

Hops, in the form of either the ground dried plant or pellets, are used in brewing to give the beverages, such as beer or ale, their characteristic bitter flavor and pleasant aroma. The hops usually are added to the boiling wort in the brewing kettle. Alternatively, if primarily a bitter flavor is desired, a hop extract can be added to the brewing kettle or an isomerized hop extract, if it is highly purified, may be added post kettle, i.e., after the wort has been boiled or after fermentation.

The primary hop constituents which are utilized in the brewing process are the alpha acids, the beta acids, the uncharacterized resins and the hop oils. The alpha acids are known as humulones and the beta acids are known as lupulones. The alpha acids are the precursors of the bitter substances in beer. The beta acids or lupulones have low solubility in wort and beer and they are believed to play a relatively minor role in the brewing process.

During brewing, chemical changes are made in the alpha acids or humulones resulting in the formation of compounds known as iso-alpha acids, i.e., isohumulone, isocohumulone and isoadhumulone. The alpha acids are extracted from the hops by the boiling wort and isomerized to the iso-alpha acids during the kettle boiling stage.

It is known that iso-$\alpha$-acids derived from hops (or an unreduced hop extract which contains iso-$\alpha$-acids) can cause light instability in malt beverages. The exposure of such a beverage to light can result in the beverage becoming "light struck" and having a skunky odor. As a result, such beverages cannot be packaged in clear or green glass bottles without a risk of developing the "light struck" character. Light stable beers that can be packaged in clear or green glass bottles are made using reduced hop extracts.

Hop extracts have been used in brewing beer for a number of years. The reasons are several-fold. When whole hops are added to the kettle, the yield of iso-alpha acids is poor, e.g., 10–25% based on the alpha acids present in the hops. However, the conversion of alpha acids in a hop extract to iso-alpha acids can be very high, e.g. 80%. Furthermore, the utilization of the pure iso-alpha acids in a preisomerized extract which is added post kettle is known to be extremely high, e.g. 70–90%.

The predominant production of hop extracts consists of extracting the essential bittering acids from the cellulosic material of the hop blossom by the use of either organic solvents or carbon dioxide. The hop extracts thus obtained can be added to the brewing kettle or chemically processed to isomerize and reduce the alpha acids. The hops from which the alpha acids have been removed are generally referred to as "spent hops" (but hereinafter referred to as "hop solids") and they are discarded or sold as animal feed.

We have discovered that one disadvantage of adding hop extracts to the wort in the kettle is that the beer produced lacks the full flavor and aroma produced when whole hops are added to the wort in the kettle. As a result, fermented beverages, such as beer, which have been prepared using hop extracts, although they may have the bitterness of beverages prepared from whole hops, do not have the same full hop flavor as fermented beverages made with whole hops. However, the use of whole hops to obtain the full hop flavor results in a very bitter tasting beverages which may not be desired.

There are other disadvantages to using hop extracts. For example, the use of a $CO_2$ or hexane hop extract does not produce a light stable or fully kettle hopped beverage. Also, use of a processed $CO_2$ hop extract (to make "hydrohop") does not produce a fully kettle hopped beverage. It would be advantageous to have a method of preparing less bitter, fermented beverages having the same "full hop flavor" as fermented beverages prepared with the use of whole hops.

It has been surprisingly discovered that the use of hop solids or an extract of hop solids produces a light stable, fully kettle hopped beverage. Several of the inventors have disclosed (in a separate co-pending patent application) a method of preparing a full hop flavored beverage using hop solids. Hop solids have historically been a useless by-product of the hop extraction process. It has now been surprisingly discovered that an extract of the hop solids can be used to produce a beer judged to have a superior hop flavor when compared to a beverage made from hop extracts or even to a beverage made from hop solids themselves.

It is important to note that the "full" or "kettle" hop flavor refers to the flavor derived from whole hops or hop pellets after fermentation, not the original aroma of whole hops, hop pellets, $CO_2$ hop extract, or even hop character fraction.

BRIEF SUMMARY OF THE INVENTION

The primary objects of the present invention are to disclose methods of preparing extracts of hop solids and the extracts of hop solids thus obtained.

It is the primary object of the present invention to disclose a method of preparing a hop flavored, fermented beverage which has the full hop flavor of a fermented beverage prepared from whole hops, but which is less bitter than the beverage made using whole hops.

We have discovered that an extract of hop solids (the hop solids remaining after the extraction of whole hops with carbon dioxide) can be used as the sole hopping material, to prepare a novel fermented beverage having a full hop flavor and little bitterness.

It is a further object to disclose methods for preparing a fully kettle hop flavored beverage using the novel extracts of hop solids.

As previously mentioned, hop solids are those solids which remain after substantially all of the alpha acids, beta acids, and hop oils have been removed from hops by a solvent, preferably by the liquid or supercritical carbon dioxide ($CO_2$)

It is a further object to disclose novel flavoring agents which comprise an extract of hop solids.

The method of the present invention for making a fully kettle hop flavored beverage comprises adding to a fermentable growth media, prior to bio-conversion, (e.g., prior to or during kettle boil, or post knock out) an extract of hop solids as the sole hopping material; and bio-converting the media to form a hop flavored beverage, wherein the hop solids have no more than 0.5% w/w alpha acids.

Another aspect of the present invention provides a hop flavored beverage prepared by the foregoing method. A further aspect provides a hop flavored beverage prepared by adding to a fermentable growth media, prior to bio-conversion, an extract of hop solids as the sole hopping material, wherein the hop solids have no more than 0.5% w/w alpha acids and then bio-converting the media to the hop flavored beverage.

Another aspect of the present invention provides a hop flavoring agent for beverages comprising an extract of hop solids, wherein the hop solids have no more than 0.5% w/w alpha acids. Preferably, a non-polar solvent like carbon dioxide or hexane is used for the extraction of whole hops to produce the hop solids. The extraction of the hop solids is preferably accomplished by using a polar solvent.

The polar solvent can be selected from the group consisting of water, ethanol, isopropanol, methanol, dichloromethane, trichloromethane, n-butanol, ethylacetate, ethylene dichloride, and trichloroethylene. Most preferably the polar solvent is ethanol or water.

A further aspect of the present invention provides a method of making a fully kettle hop flavored beverage comprising bio-converting a fermentable growth media and adding to the converted media a fermented water extract of hop solids, the hop solids having no more than 0.5% w/w alpha acids. A hop flavored beverage is also provided by this method.

A still further aspect of the present invention provides a hop flavored beverage prepared by adding to a bio-converted fermentable growth media a fermented water extract of hop solids, the hop solids having no more than 0.5% w/w alpha acids.

A final aspect of the present invention provides a hop flavoring agent for beverages comprising a fermented water extract of hop solids, the hop solids having no more than 0.5% w/w alpha acids.

Important advantages of the present invention are that it makes possible the preparation of a fully kettle hop flavored beverage which was previously unavailable and that such a beverage can be prepared using a byproduct of hop solids which is itself an inexpensive and previously discarded byproduct.

A surprising aspect of the present invention is that an extract of the hop solids can be used in a method of adding a fully kettle hop flavor to beverages.

DETAILED DESCRIPTION OF THE INVENTION

Hop solids are those which remain after substantially all of the alpha acids, beta acids, and hop oils has been removed from hops, preferably by the liquid carbon dioxide ($CO_2$) extraction of ground hops or hop pellets.

To determine the scope and effectiveness of the present invention experimental work was performed using a $CO_2$ extract, hop solids, extracts of hop solids, and extracted hop solids (all prepared from Cascade hop pellets). Each fraction was evaluated for its contribution to kettle hop flavor. As a result, it was found that the extract of hop solids most effectively imparts a conventional full hop flavor to beer. The results of sensory evaluation confirmed that beverages made with the extracts of hop solids had a hop flavor similar to that of beverages made using hop pellets. The tests also confirmed that the beer made with the extracts of hop solids could be packaged in the clear white (flint glass) or green bottles.

The hop solids for use in the invention are the spent hops which remain after substantially all of the alpha acids, beta acids, and hop oils have been extracted (in whole or in part) from whole hops with a non-polar fluid, such as liquid carbon dioxide, supercritical carbon dioxide, hexane, or the like. Generally, hop solids can be the residue remaining after any extraction of hops to remove substantially all of the alpha acids, beta acids, and/or hop oil.

The hop solids, alpha-acids and Hop Character Fraction (HCF) can be obtained from whole hops by a process that can be illustrated as follows:

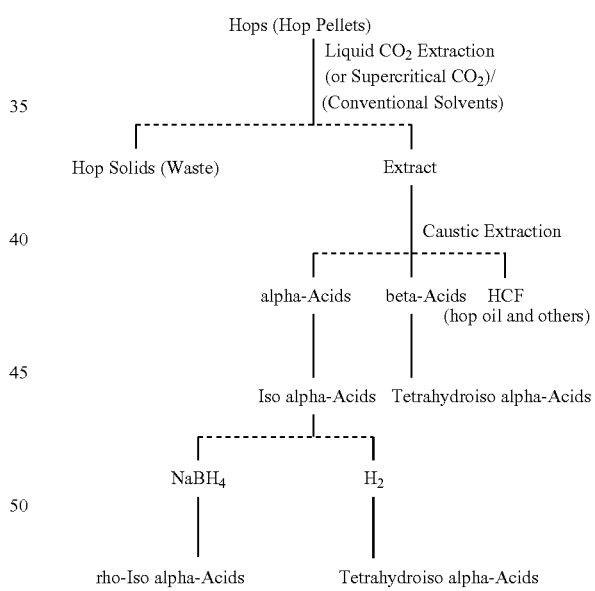

The following is a brief description of the experimental tests performed and the materials employed.

Description of the Preferred Embodiments

By a fermentable growth media we mean (1) a conventional wort, or (2) any minimal media containing Difco yeast N base (0.8–8 g/l, preferably 1.7 g/l) and glucose (1–20% by weight, preferably 8–10%), or any combination of (1) and (2). By bio-converting we mean a fermentation process whereby the extracts of hop solids are converted to kettle hop flavor wherein the yeast is at a fermentable temperature and glucose is present.

1. Ethanol Extract of Hop Solids

EXAMPLE 1

Using a polar extract of hop solids (the hop solids being the residue of a first extraction of hops with a non-polar solvent to remove the alpha acids) to make a hop flavored beverage results in a beverage which is rich in positive hop components (fruity, estery, hoppy) and devoid of negative ones (dry hop, green, tea-like, hop oil-like). Various components of Cascade hops (whole pellet; $CO_2$ extract; hop solids; and extracts of hop solids) were investigated to evaluate their capacity to deliver kettle hop flavor to a finished brew.

Sensory panels concluded that no significant level of kettle hop flavor was associated with any $CO_2$ extract or fraction thereof. This lead to the conclusion that the component responsible for kettle hop flavor must still reside in the spent ($CO_2$ extracted) hop (hop solids). Using the $CO_2$ extracted hop solids to make a hop flavored beverage confirmed that it indeed contained the precursor material which is converted during fermentation into "kettle hop flavor".

$CO_2$ extracted hop solids is typically in the form of dust which makes it difficult to handle. One option explored was solvent extracting the dust so that the important hop flavor components could be delivered as an easily handled liquid. Thus, ethanol was employed as a solvent to extract spent Cascade and spent Galena hop solids.

Referring now to Table 1, several 10 gallon lab brews were made using the ethanol extract from hop solids and the brews were then evaluated. A pale malt beverage product with the special ethanol extract was submitted for sensory testing (column 2). The product was monadically evaluated by fifteen panelists who routinely evaluate interplant beverage samples. Nine flavor attributes were rated in replicate using the QDA method. Mean scores are based on a 24-point linear scale.

The results are given below. Compared to a low hop flavored pale malt beverage (column 3), this product has more aroma strength, fruity/estery character, hop character, diacetyl character and aftertaste than typically found for a low hop flavor pale lager beverage.

TABLE 1

| Characteristic | Ethanol Extract Flavored Pale Lager Beer (Mean Score) | Low Hop Flavor Pale Lager Beer (Mean Score) |
| --- | --- | --- |
| Aroma Strength | 14.0 | 11.8 |
| Fruity/Estery | 11.8 | 9.2 |
| Hop Character | 10.4 | 8.5 |
| Malty/Grainy | 7.8 | N/A |
| Sulphidic/tic | 5.7 | 5.3 |
| Diacetyl | 4.8 | 3.7 |
| Bitterness | 11.0 | 10.6 |
| Body | 11.3 | N/A |
| Aftertaste | 12.0 | 10.8 |

Comments: fruity/estery-3 panelists

The evaluation showed that a most pleasant estery hop flavor was produced using an ethanol extract of hop solids and was judged more pleasurable than using hop solids alone. This lead to the understanding that ethanol extraction removes the most pleasant attributes from hop solids, but not the negative ones.

This observation was confirmed by evaluating brews made with (1) hop solids; (2) ethanol extracted hop solids; and (3) ethanol extract of hop solids. The brew with hop solids (1) had a typical cascade kettle hop flavor. The brew with ethanol extracted hop solids (2) had a distinct dry hop flavor lacking in fruity, estery attributes. The brew with the ethanol extract of hop solids (3) had an unusually pleasant fruity/estery/hoppy flavor and aroma which is prized in hop flavored beverages (see Table 10). By dry hop flavor we mean any flavor derived from adding hops post-fermentation.

Although ethanol is the most preferred solvent for extracting hop solids, it is envisioned that any polar solvent will work. We envision the preferred extraction solvents to include water, isopropanol, methanol, dichloromethane, trichloromethane, n-butanol, ethyl acetate, ethylene dichloride, and trichloroethylene.

The amount of hop solids extract to be added depends upon the amount of flavoring desired in the resulting beverage and the concentration of the desired extract components in the extraction solvent. Typically, the amount of hop solids extract added will range from 10 ppm to 10,000 ppm, more preferably 100 ppm to 5,000 ppm, and most preferably from 1,000 ppm to 3,000 ppm (based on the extraction of a given amount of hop solids).

$CO_2$ extraction of Cascade hops. The hops were extracted with liquid $CO_2$ at 50° F. and 700 psi. The residue (the hop solids) was retained for further processing.

Preparation of an ethanol extract of hop solids. A sample of Cascade hop solids was obtained from the hop pilot plant liquid $CO_2$ extractor, runs 640–641. The hop solids were greatly depleted of alpha acids (only 0.3% left), beta acids, and hop oils. The hop solids are normally treated as a waste fraction, considered as having no value. Normally only the $CO_2$ extract is considered as having value.

110.9 grams of hop solids were slurried with 576 grams of 95% v/v ethanol and poured into a glass chromatography column. The ethanol was allowed to slowly percolate at ambient temperature and pressure through the bed of hop solids. The filtered eluate (dark green colored ethanol extract) was collected (yield 350.6 grams wet weight).

Preparation of beer kettle hopped with the ethanol extract. A sample of Milwaukee Brewery wort from the cooler (which contained a negligible amount of hops products) was brought to the lab for a re-boil. 18.2 kg of cooler wort and 2.0 kg water were brought to a boil in a kettle. 95.9 grams of ethanol extract (1,000 ppm based on hop solids) (see above) were added at 60 minutes before knockout. At 30 minutes before knockout, another 95.9 grams of ethanol extract (1,000 ppm based on hop solids) were added to the kettle. The knockout wort 16.8 kg was cooled and pitched with 12 million yeast cells/ml, aerated and fermented at 60° F. for 7 days. The young beer was primary filtered and finished to a 3.65% w/w alcohol. The resulting beer was deemed to have a desirable estery/hoppy flavor, free of dry hop flavor as evaluated by the fifteen member expert round table as shown in Table 1.

2. Water Extract of Hop Solids

EXAMPLE 2

Water can also be used to obtain an extract of the hop solids which, when added before the fermentation step, produces a desirable hop flavored beverage. The water extract of the hop solids is hereinafter referred to as "hop tea." Likewise, the hop tea may be fermented and used to produce a desirable hop flavored beverage. The fermented top tea may be used as is, or it may be further processed by ultrafiltration (through a 300 nominal molecular weight cutoff membrane) whereby the permeate may be used as the hop flavoring. Gases from the hop tea fermenter may also be cold-trapped, whereby the condensate may be used as the hop flavoring.

One advantage of using a fermented hop tea (or permeate/condensate) is that it may be added after fermentation to produce a desirable hop flavored beverage. Thus, the fermented hop tea may be added post-fermentation to customize any desired level of hop flavoring to the finished hop flavored beverage.

Referring now to Tables 2, 3 and 4 below, a number of hop flavored beverages were made using the above hop teas and evaluated by a fifteen member sensory panel. Nine flavor attributes were rated in replicate using the QDA method. Mean scores are based on a 24 point linear scale. The control sample was an unhopped pale malt lager beer.

Sample #2 was a hopped beer made with hop solids (hop solids added at 3,000 ppm). Samples #7 and #9 are hopped beers made with hop solids at 15,000 ppm but blended with unhopped stock beer for a final 3,000 ppm hop solids equivalent. Samples #3 through #6 are hopped beers made with hop tea (produced by the exhaustive extraction of hop solids with water at either 170° or boiling) added at a 3,000 ppm hop solids equivalent.

Sample #8 is a hopped beer made by adding post-fermentation a fermented hop tea to a 3,000 ppm hop solids equivalent. The hop tea was pitched with $25 \times 10^6$ cells/ml of standard brewing yeast and was fermented at 60° F. for 10 days using minimal media (Difco yeast N base and glucose).

BFKO means "before knock out." $SCO_2$ means hops extracted with supercritical $CO_2$. $LCO_2$ means hops extracted with liquid $CO_2$. MR means a pale malt lager beer.

TABLE 2

| Sample ID | Description |
| --- | --- |
| Control | Control-Unhopped |
| #2 | Standard-Steiner Galena $SCO_2$ Hop Solids-3000 ppm 60 min. BFKO |
| #3 | Experimental-Hop Tea added 60 min. BFKO-3000 ppm equivalent (Steiner Galena $SCO_2$ Hop Solids extracted with BOILING water-30,000 ppm) |
| #4 | Experimental-Hop Tea added 60 min. BFKO-3000 ppm equivalent (Steiner Galena $SCO_2$ Hop Solids extracted with 170° water-30,000 ppm) |
| #5 | Experimental-Hop Tea added 0 min. BFKO-3000 ppm equivalent (Steiner Galena $SCO_2$ Hop Solids extracted with 170° water-30,000 ppm) |
| #6 | Experimental-Hop Tea added at Fermentation-3000 ppm brew kettle equivalent (Steiner Galena $SCO_2$ Hop Solids extracted with 170° water-30,000 ppm) |
| #7 | Experimental-Fermented Galena hop solids hopped beer blended post Fermentation-3000 ppm brew kettle equivalent (Steiner Galena $SCO_2$ Hop Solids added to MR at 15,000 ppm and fermented-blended 85.3% MR stock) |
| #8 | Experimental-Fermented hop tea added post Fermentation-3000 ppm brew kettle equivalent (Steiner Cascade $SCO_2$ Hop Solids extracted with boiling water-30,000 ppm and diluted to 15,000 ppm with water and minimal medium containing 10% Dextrose final) |
| #9 | Experimental-Fermented Cascade hop solids hopped beer blended post Fermentation-3000 ppm brew kettle equivalent (Miller Pilot Cascade $LCO_2$ Hop Solids added to MR at 15,000 ppm and fermented-blended with 85.3% MR stock) |

TABLE 3

ANALYSIS OF VARIANCE
Mean Score*

| Attribute | Control | #2 | #3 | #4 | #5 | #6 | #7 | F-Value | Level of Significance |
| --- | --- | --- | --- | --- | --- | --- | --- | --- | --- |
| Aroma Strength | $10.6^b$ | $11.5^a$ | $11.1^a$ | $11.8^a$ | $11.5^a$ | $11.7^a$ | $12.1^a$ | 2.21 | 95.3% |
| Fruity/Estery | $8.3^b$ | $10.0^a$ | $9.7^a$ | $9.7^a$ | $9.7^a$ | $9.7^a$ | $8.7^{ab}$ | 3.46 | 99.7% |
| Hop Character | $8.4^a$ | $9.5^a$ | $8.6^a$ | $8.8^a$ | $9.0^a$ | $8.9^a$ | $8.2^a$ | 1.47 | NSD |
| Malty/Grainy | $7.9^a$ | $7.4^a$ | $7.5^a$ | $7.1^a$ | $7.1^a$ | $7.5^a$ | $7.6^a$ | 0.66 | NSD |
| Sulphidic/ | $5.9^{ab}$ | $4.9^b$ | $5.4^{ab}$ | $5.0^{ab}$ | $5.3^{ab}$ | $6.0^a$ | $5.5^{ab}$ | 2.24 | 95.6% |

TABLE 3-continued

ANALYSIS OF VARIANCE
Mean Score*

| Attribute | Control | #2 | #3 | #4 | #5 | #6 | #7 | F-Value | Level of Significance |
|---|---|---|---|---|---|---|---|---|---|
| tic | | | | | | | | | |
| Diacetyl | 3.6[b] | 4.3[b] | 4.8[b] | 4.5[b] | 4.5[b] | 4.0[b] | 8.0[a] | 9.70 | 99.9% |
| Bitterness | 9.9[a] | 10.4[a] | 9.7[a] | 10.4[a] | 9.7[a] | 10.3[a] | 10.3[a] | 1.53 | NSD |
| Body | 10.2[a] | 10.8[a] | 10.3[a] | 10.2[a] | 10.2[a] | 10.0[a] | 10.9[a] | 1.52 | NSD |
| Aftertaste | 10.1[a] | 10.4[a] | 10.3[a] | 11.0[a] | 10.2[a] | 10.7[a] | 10.9[a] | 1.71 | NSD |
| N = 21 | | | | | | | | | |

Comments
2 - fruity - 2 panelists
- winey - 2 panelists
5 - oxidized - 2 panelists
6 - oxidized - 5 panelists
*Mean scores sharing a common letter are not significantly different.

TABLE 4

ANALYSIS OF VARIANCE
Mean Score*

| Attribute | Control | #8 | #9 | F-Value | Level of Significance |
|---|---|---|---|---|---|
| Aroma Strength | 11.0[c] | 13.5[a] | 12.2[b] | 21.48 | 99.9% |
| Fruity/Estery | 7.9[b] | 9.4[a] | 9.3[a] | 7.75 | 99.9% |
| Hop Character | 8.2[b] | 8.6[b] | 9.6[a] | 6.96 | 99.8% |
| Malty/Grainy | 7.2[b] | 7.1[b] | 8.0[a] | 3.85 | 97.4% |
| Sulphidic/tic | 5.6[a] | 5.6[a] | 5.9[a] | 0.44 | NSD |
| Diacetyl | 3.3[b] | 10.4[a] | 4.8[b] | 36.83 | 99.9% |
| Bitterness | 9.5[c] | 10.6[b] | 12.1[a] | 26.72 | 99.9% |
| Body | 9.9[b] | 10.7[a] | 11.3[a] | 6.52 | 99.8% |
| Aftertaste | 9.7[b] | 12.1[a] | 11.9[a] | 12.80 | 99.9% |
| N = 39 | | | | | |

Comments
8 - diacetyl - 8 panelists
- spoiled - 4 panelists
*Mean scores sharing a common letter are not significantly different Tables 2 through 4 show that a hop tea or fermented hop tea may be used to produce a hop flavored beverage having a desirable aroma, fruity/estery attributes, and a favorable hop character. Depending on the desired attributes of the finished hop flavored beverage, the hop solids, hop tea, or fermented hop tea can be added at 0.1 to 7.5 lbs/barrel based on hop solids equivalent.

Other considerations. Although the present invention has been described wherein the ethanol extract is added to the kettle boil, it is also possible to add the polar solvent extract post kettle but prior to fermentation.

It is preferred that the hop solids have no more than about 0.5% w/w (dry basis) alpha acids and, more preferably, no more than 0.3% w/w (dry basis) alpha acids. Thus, it is preferred that a non-polar solvent like $CO_2$ or hexane be used to extract the whole hops or hop pellets. It is most preferred that liquid or supercritical $CO_2$ be used. If a polar solvent (like ethanol, water, etc.) is used to extract the whole hops or hop pellets, an undesirably higher residual amount of alpha acids remains in the hop solids. Also, using a polar solvent to extract the hops results in a depletion of the critical kettle hop flavor components in the hop solids. Thus, it is critical that a non-polar solvent like $CO_2$ be used to extract the whole hops.

It is also preferred that a polar solvent be used to extract the hop solids. Most preferably the polar solvent is ethanol or water. The polar extraction solvent also can be a mixture of ethanol and water in any combination. The use of a polar solvent results in the extraction of the most desirable kettle hop flavor components from the hop solids. In contrast, using a non-polar solvent to extract the hop solids would leave behind important kettle hop flavor components.

CONCLUSION

The foregoing test results indicate that there was essentially no kettle hopped flavor difference between the light stable beer made by the method of the present invention and the light unstable beer made with hops. The beers made by the practice of the present invention had acceptable taste and foam characteristics, as well as light stability due to the low level of iso-alpha acids. Thus, it is possible by the practice of the method of the present invention to prepare a light stable, full hop flavored beer using hop solids and extracts of hop solids.

It will be apparent to those skilled in the art that the method of the present invention, in addition to being novel and useful, is also simple and economical. For example, only conventional brewing techniques and equipment are used and the useful flavoring constituents of the hop solids are not wasted.

The hop solids preferred for use in the method of the present invention are the hop solids obtained after the liquid carbon dioxide extraction of hops under 40° to 80° F. and 500–1000 psig. The liquid carbon dioxide extraction of hops is described in U.S. Pat. No. 4,344,978. Other hop solids that can be used are those obtained by the extraction of hops with supercritical $CO_2$ at a temperature of 100°–150° F. and pressure of 1100–3000 psig., or by the practice of the extraction methods of U.S. Pat. Nos. 3,798,332; 4,002,683; and others.

Representative of the different types of hops that can be used to prepare the hop extract and hop solids are Cascade hops and Galena hops. However, other varieties of hops also can be used.

The amount of hop solids extract to be added depends upon the amount of kettle hop flavor desired in the resulting beverage. Normally, if the hop solids extract are used alone the amount employed will be equivalent to the equivalent amount of whole hops that would be employed for the same flavor whole hopped beer. When the preferred composition containing both hop solids and HCF are used the amount employed will be about 0.5× to about 3× or more of the amount of whole hops that would be employed.

It will be apparent to those skilled in the art that a number of modifications and changes may be made without departing from the spirit and scope of the invention.

For example, an exhaustive extraction of hop solids with boiling ethanol resulted in about a 28% by weight extract on a dry basis. Also, an exhaustive extraction of hop solids with boiling water resulted in about a 45% by weight extract on a dry basis. Both of these extracts produce a fully kettle hop flavored beverage.

Therefore it is to be understood that the invention is not to be limited by the description and examples but only by the claims which follow:

We claim:

1. A method of making a hop flavored beverage from a fermentable growth media comprising the steps of:
    adding to the media, prior to bio-conversion, an extract of hop solids as the sole hopping material; and
    bio-converting the media to form the hop flavored beverage,
    wherein the hop solids have no more than 0.5% w/w alpha acids,
    wherein the hop flavored beverage is light stable.

2. The method of claim 1, wherein the hop solids are the residue of a $CO_2$ extraction of hops.

3. The method of claim 1, wherein the hop solids are extracted with a polar solvent.

4. The method of claim 3, wherein the polar solvent is selected from the group consisting of water, ethanol, isopropanol, methanol, dichloromethane, trichloromethane, n-butanol, ethyl acetate, ethylene dichloride, and trichloroethylene.

5. The method of claim 4, wherein the polar solvent is ethanol.

6. The method of claim 4, wherein the polar solvent is water.

7. A method of making a hop flavored beverage from a fermentable growth media comprising steps of:
    bio-converting the media; and
    adding to the converted media a fermented water extract of hop solids as the sole hopping
    material, wherein the hop solids have no more than 0.5% w/w alpha acids,
    wherein the hop flavored beverage is light stable.

* * * * *

UNITED STATES PATENT AND TRADEMARK OFFICE
CERTIFICATE OF CORRECTION

PATENT NO.         : 7,144,592 B2                                        Page 1 of 1
APPLICATION NO.    : 10/074830
DATED              : December 5, 2006
INVENTOR(S)        : Sydney R. Rader et al.

It is certified that error appears in the above-identified patent and that said Letters Patent is hereby corrected as shown below:

On the Title page at (73) Assignee, "Nissan Technical Center North America MI (US)" should be -- Miller Brewing Company, Milwaukee, WI (US) --.

On the front page at (74) Attorney, Agent, or Firm, "Global IP Counselors" should be -- Quarles & Brady LLP --.

Signed and Sealed this

Thirteenth Day of February, 2007

JON W. DUDAS
*Director of the United States Patent and Trademark Office*